United States Patent
Obeng et al.

[11] Patent Number: 6,133,158
[45] Date of Patent: Oct. 17, 2000

[54] PROCESS FOR REMOVING ALKALI METALS FROM SOLVENTS USED IN THE MANUFACTURE OF SEMICONDUCTOR WAFERS

[75] Inventors: Yaw S. Obeng, Orlando, Fla.; Robert L. Opila, Scotch Plains; Ramaswamy S. Raghavan, Berkeley Heights, both of N.J.

[73] Assignee: Lucent Technologies Inc., Murray Hill, N.J.

[21] Appl. No.: 09/013,726

[22] Filed: Jan. 27, 1998

[51] Int. Cl.$^7$ .................................................. H01L 21/302
[52] U.S. Cl. .......................... 438/745; 438/754; 216/87; 216/100
[58] Field of Search .............................. 134/1.3, 1.2, 1.1; 216/87, 100, 101; 438/745, 754

[56] References Cited

U.S. PATENT DOCUMENTS

| | | | |
|---|---|---|---|
| 4,941,489 | 7/1990 | Kamimura et al. | 134/95.3 |
| 5,417,802 | 5/1995 | Obeng | 216/13 |
| 5,464,786 | 11/1995 | Figura et al. | 437/52 |
| 5,520,205 | 5/1996 | Guldi et al. | 134/98.1 |
| 5,670,019 | 9/1997 | Huang | 438/628 |
| 5,695,569 | 12/1997 | Douglas | 134/1.3 |
| 5,783,495 | 7/1998 | Li et al. | 438/738 |
| 5,869,140 | 2/1999 | Blohowiak et al. | 427/307 |

OTHER PUBLICATIONS

Silicon Processing for the VLSI Era, vol. 2, S. Wolfe Chapter 3: Contact Technology . . . pp. 121–128; 130–134.

*Primary Examiner*—Benjamin L. Utech
*Assistant Examiner*—Kin-Chan Chen

[57] ABSTRACT

The present invention provides a method for removing contaminant metals from a solvent used in the manufacture of a semiconductor wafer. The method may comprise the steps of bringing a solvent having contaminant metals therein into contact with a sacrificial body having titanium oxide associated therewith and cleaning the semiconductor wafer with the solvent. The titanium oxide reacts with the contaminant metals to substantially remove them from the solvent to provide a substantially cleaner solvent for the production of metal oxide semiconductor (MOS)devices. The present invention is particularly applicable in "back-end" processes of such devices.

23 Claims, 2 Drawing Sheets

PROCESS FOR REMOVING ALKALI METALS FROM SOLVENTS USED IN THE MANUFACTURE OF SEMICONDUCTOR WAFERS

TECHNICAL FIELD OF THE INVENTION

The present invention is directed, in general, to a method for removing contaminant metals from solvents and more specifically, to a process for removing alkali metals from solvents used in the manufacture of semiconductor wafers by using titanium oxide.

BACKGROUND OF THE INVENTION

The fabrication of complimentary metal oxide semiconductor (CMOS) devices involve hundreds of distinct steps, the last third of which is the metallization stage where typically titanium/titanium-nitride/aluminum-silicon-copper-alloys/titanium (Ti/TiN/AlSiCu/Ti) metal patterns of contacts are photolithographically defined. The processing within the "Device" level, i.e., electrically active area, is referred to as the "front-end" processes and those within the "Interconnection and Passivation" levels, such as the metallization stage, are referred to as "back-end" processes.

Following the lithography, the unexposed parts of the photoresist are typically removed either by plasma etching or wet chemical processing by specially engineered organic solvents. During the resist stripping, device layers such as TiN are vulnerable to contamination by trace metals, such as sodium (Na) and iron (Fe), in the stripper solvents, which are major sources of these trace metals, or from non-reagent sources such as the walls of chambers during high temperature plasma etching of resist materials. Wet processing by stripper solvents, in particular, have been identified as the principal Na contamination route and has become a focus of the "Na problem" in CMOS device fabrication.

Metal contamination, in particular Na, is critical for device technology since Na ions lead to degradation of the stability of devices by the mobile Na. For example, the positive Na ions at the Si—$SiO_2$ (silicon oxide) interface induce a negative image charge in the silicon substrate, which reduces the positive gate bias required to produce a channel current at a given drain voltage. Na densities as low as $10^{10}/cm^2$ can cause threshold voltage shifts of a few tenths of volts in metal oxide semiconductor field effect transistor (MOSFET) devices with gate thickness of about 1000 A. N-channel devices are generally more sensitive to Na contamination than p-channel transistors. Other contaminants, such as Fe, in dissolved or particulate form, result in degradation or failure of the gate oxide integrity, a problem that becomes increasingly acute as the gate oxide thickness shrinks to <50 A in ultra large scale integrated (ULSI) device structures.

The solvents typically used in the front-end cleaning processes, such as acids, do not pose as great a problem as the solvents that are used in the back-end cleaning process. However because of the presence of the metal runners and interconnect structures that are formed during the back-end processes, different solvents, which are typically organic in nature are used to clean the device. During the back-end cleaning processes, dielectric and metallic films, such as TiN, are particularly vulnerable to contamination by trace alkali and alkali-earth ions, e.g., $Na^+$, potassium ($K^+$) and calcium ($Ca^{2+}$). This enhanced metal ion contamination is attributable to enhanced metal ion adsorption from the solvents used in the back-end cleaning process.

Exacerbating the contamination problem discussed above, is that the solvents used in the back-end cleaning processes usually contain about 10–15 ppb, i.e, 0.6 to 6.0 E15 atoms/ml solvent, alkali metal ions. With the high absorption rate, generally most of the metal ions in the solvent end up on the wafers.

To prevent or minimize Na contamination, a two-step "cleaning recipe" may be employed. This process involves a post solvent cleaning etch of native/passivating oxide with glycol based selective etchants, e.g., ACSI-NOE or ACT-CE15. This cleaning process, however, is an expensive strategy from the perspective of chemical use and disposal costs, as well as process time. Another strategy for minimizing Na/metallic contamination involves complexing the Na/contaminant with ligands, such as crown ethers, polyalcohols and other clathrates. These organic ligands, however, may be carcinogenic and pose a health risk, so that extreme care must be exercised in the product formulation and utilization.

Accordingly, what is needed in the art is an improved method of back-end cleaning of wafers that mitigates the above-described limitations and substantially reduces the metal ion contaminants in the cleaning solvent.

SUMMARY OF THE INVENTION

To address the above-discussed deficiencies of the prior art, the present invention provides a method for removing contaminant metals from a solvent used in the manufacture of a production semiconductor wafer. In one particularly advantageous embodiment, the method comprises the steps of bringing a solvent having contaminant metals therein into contact with a sacrificial body having titanium oxide associated therewith and cleaning the semiconductor wafer with the solvent. The titanium oxide reacts with the contaminant metals to remove them from the solvent and provide a substantially cleaner solvent for the production of metal oxide semiconductor (MOS)devices. However, it will, of course, be appreciated that complete removal of all the contaminant metals is often impossible or impracticable to achieve. Therefore, the word "removing" as used herein is intended to mean that a substantial portion of the contaminant metal is removed such that any remaining contaminant metals do not produce deleterious effects in the production semiconductor wafer. While it is within the scope of the present invention that it may be used in any fabrication phase of the MOS device, it is particularly applicable in "back-end" processes of such devices because the presence of the various metal interconnect layers prevent the use of solvents that may damage the metal interconnect structures.

Thus, the present invention provides a method that departs from conventional cleaning processes. The present invention uses a sacrificial body to absorb a substantial portion of the contaminant metal so that those metals do not contaminate the production semiconductor wafers. As discussed herein, the sacrificial body may, in one embodiment, may take the form of a sacrificial wafer, which can be prepared without the front-end processing that is typically associated with production semiconductor wafers. This saves substantial cost because expensive and time-consuming front-end process are not necessary to produce the sacrificial semiconductor wafer since the purpose of the semiconductor is cleaning the solvent only. Furthermore, production wafers, which do include expensive and time-consuming front-end processes, need not be contaminated with the undesirable metals. Alternatively, however, the sacrificial body may be a production wafer that is simply sacrificed for purposes of filtering the solvent only and then discarded when the filtering step is complete. In yet another embodiment, the sacrificial body may be a filter containing titanium oxide, such as a canister as described below.

In one embodiment, the step of bringing the solvent in contact with titanium oxide includes the step of placing a sacrificial semiconductor wafer, which has an oxidizable titanium compound thereon, in the solvent prior to the cleaning step. In one aspect of this particular embodiment, the oxidizable titanium compound is titanium nitride and the method further comprises the step of oxidizing the titanium nitride to titanium oxide. The oxidization of the titanium may be achieved by exposing the titanium nitride layer to an oxygen environment. In yet another aspect, the step of cleaning includes the step of placing the production semiconductor wafer in a cleaning bath of the solvent subsequent to the placing step.

In another embodiment, the step of bringing the solvent in contact with titanium oxide includes the step of passing the solvent through a titanium oxide filter prior to the cleaning step. This particular embodiment is particularly useful in those processes that do not place the semiconductor wafer in a solvent bath. In such instances, the solvent feed line may be connected directly to the titanium oxide filter. Under line pressure, the solvent is passed through the titanium oxide filter, which allows the titanium oxide filter to react with and substantially remove the metal contaminants from the solvent. The cleaned solvent can then be applied to the semiconductor wafer. In one aspect of this particular embodiment, the step of cleaning includes the step of spraying the solvent on a production wafer subsequent to the step of passing.

In another embodiment of the present invention, the solvent includes metals contaminants that are selected from the group consisting of trace alkali and alkali-earth metal ions, and the step of bringing includes the step of the titanium oxide reacting with the alkali and alkali-earth metal ions, thereby to substantially remove the alkali, such as sodium or potassium and alkali-earth metal ions, such as calcium or magnesium from the solvent. It is well known, cleaning solvents often include trace elements of the above-mentioned metal ions. These ions can form metallic residues on the MOS devices and contaminate the devices, thereby decreasing the production yield. The purification process of the present invention substantially reduces these ions in the solvent.

In one particular embodiment, the solvent is an organic solvent comprising a majority solvent, a nucleophile, and an additive selected from the group consisting of corrosion inhibitors, complexing ligands, and surfactants. However, will be appreciated that other organic solvent typically used for the back-end process may also be cleaned in the same manner as covered by the present invention.

Yet another aspect of the present invention is directed to a method of manufacturing a semiconductor wafer having integrated circuits formed thereon. This method comprises the steps of forming an electrically active area on the semiconductor wafer, forming an interconnect metal layer over the electrically active area, wherein the interconnect metal layer is electrically connected to said electrically active area, and removing contaminant metals from a solvent used to clean the interconnect metal layer. The step of removing contaminant metals includes the steps of bringing a solvent having contaminant metals therein into contact with a sacrificial body having titanium oxide associated therein and where the titanium oxide reacts with the contaminant metals to remove the contaminant metals from the solvent and cleaning the metal interconnect layer with the solvent subsequent to the step of bringing the solvent in contact with the titanium oxide.

The foregoing has outlined, rather broadly, preferred and alternative features of the present invention so that those who are skilled in the art may better understand the detailed description of the invention that follows. Additional features of the invention that form the subject of the claims of the invention are described below. Those who are skilled in the art should appreciate that they can readily use the disclosed conception and specific embodiment as a basis for designing or modifying other structures for carrying out the same purposes of the present invention. Those who are skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
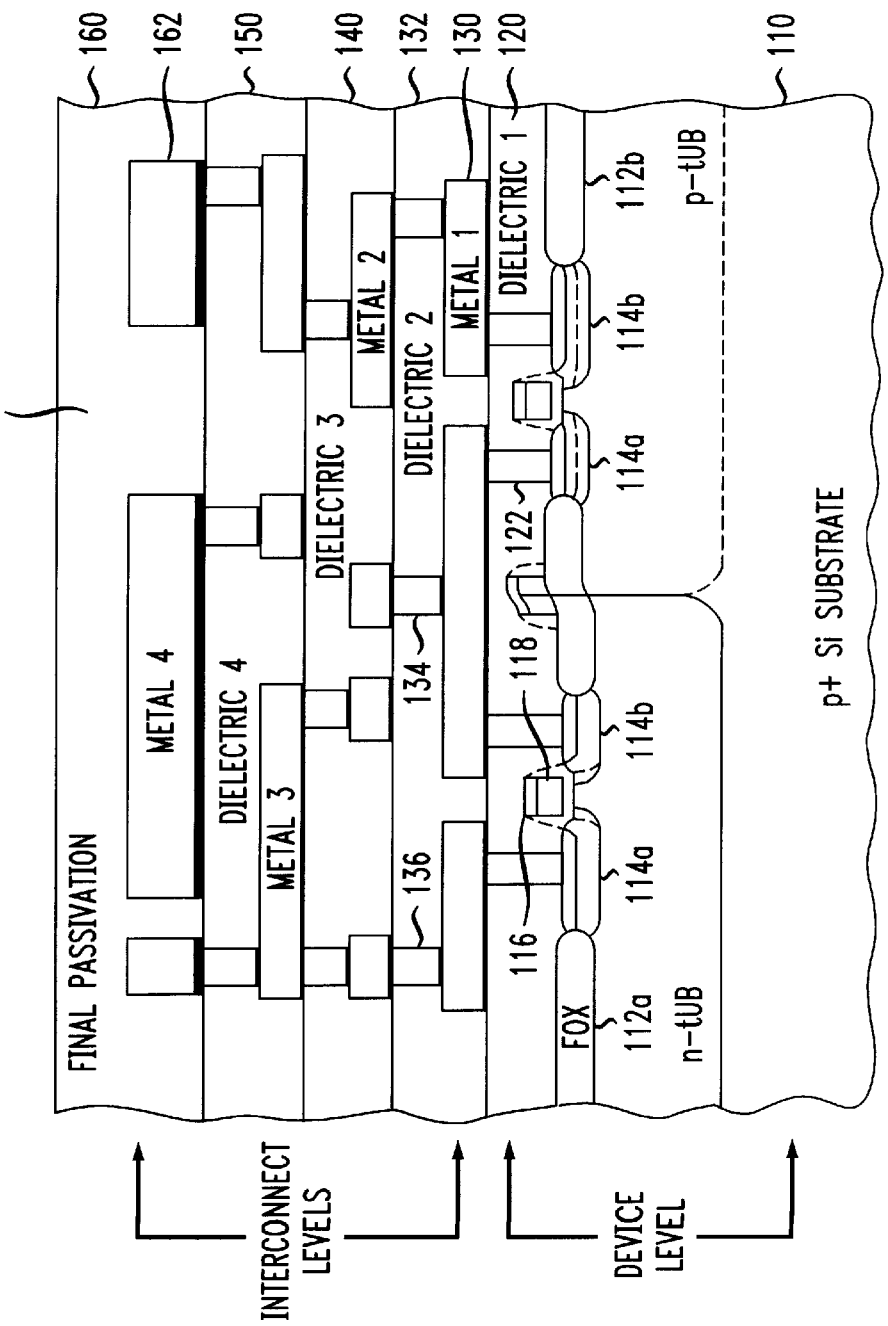
FIG. 1 illustrates a schematic cross-sectional view of an exemplary embodiment of a submicron, four-level interconnect twin-tub complementary metal oxide semiconductor (CMOS) device that provides a suitable environment to describe the practice of the present invention.

Referring initially to FIG. 1, illustrated is a schematic cross-sectional view of an exemplary embodiment of a submicron, four-level interconnect twin-tub complimentary metal oxide semiconductor (CMOS) device 100 that provides a suitable environment to describe the practice of the present invention. As illustrated in FIG. 1, the semiconductor 100 includes a substrate 110, which may be formed from materials such as silicon, germanium, germanium arsenide or other materials known to those who are skilled in the art. The substrate 110 will typically include field oxide regions 112a, 112b and doped source and drain regions 114a, 114b, all of which are formed by conventional processes. A plurality of gates 116 positioned on a plurality of gate oxides 118 may also be formed on the substrate 110. Both the gates 116 and the gate oxides 118 are also formed by conventional processes. Deposited over the gate 116 and the substrate 110, is a first dielectric layer 120.

In advantageous embodiments, the first dielectric layer 120 is deposited by conventional process using well known materials, such as tetraethyl orthosilicate (TEOS). The first dielectric layer 120 may have a plurality of contact openings 122 formed therein over the doped source and drain regions 114a, 114b. An interconnect metal, such as aluminum or tungsten, may be deposited in the contact opening to provide electrical connection to other portions of the semiconductor 100. In the illustrated embodiment, the semiconductor 100 formed up to and including the dielectric layer 120 is also known as the "Device" level and the processing within this Device level is called the "front-end" processing. The solvents used in the cleaning processes for the front-end's fabrication to the point at which the metal interconnects are formed typically includes acids. Since metals are not predominantly present in the front-end, acids can be used without fear of damaging the structures. However, it should be specifically understood that the present invention may also be employed in front-end processes if so desired.

A plurality of first metal interconnects or Metal Runners (generally designated as 130) are patterned and formed, using conventional processes, over the contact openings 122 to provide electrically conductive paths. A second dielectric layer 132 is formed over the first interconnect metals 130 using conventional processes, following which vias (generally designated as 134) are formed, using conventional processes, in the second dielectric layer 132. The vias 134 may be filled with a plurality of metal plugs 136, generally composed of a metal such as aluminum, aluminum-stack metal, tungsten or other metal known to those who are skilled in the art. The plurality of metal plugs 136 provide the electrical conductive paths to subsequent interconnect levels. A second and third interconnect levels 140, 150 are similarly formed over the first interconnect level 130. The fourth interconnect level 160 is formed when a plurality of fourth metal interconnects 162 is patterned and formed with a final passivation layer 164 deposited, using conventional processes, over it. While the processing within the device level is called front-end processing, the processing within the "Interconnection and Passivation" level is referred to as "back-end" processing.

Whereas front-end cleaning is fairly well understood and characterized, e.g., see "Handbook of Semiconductor Wafer Cleaning Technology: Science, Technology, and Application," W. Kern, W., ed, Noyce Press, Park Ridge, N.J., 1993, back-end cleaning is not as well characterized or understood. This is attributable, at least in part, to the complexity and variability of the back-end processes. The design and details of Integrated Circuits (ICs) back-end processes are generally application dependent; e.g., the interconnection of Dynamic Random Access Memory (DRAM) devices are less metal intensive and complicated than those of Application Specific Integrated Circuit Semiconductors (ASICS) of the same vintage. Back-end cleaning processing generally falls into five major areas: (1) post via/window definition cleaning to remove etch byproducts from the walls and the bottom of interconnect windows; (2) post Metal Runner definition cleaning to remove etch residues and polymers from the sides and tops of the runners; (3) photoresist "Edge Bead" removal to clean off excess photoresist that accumulated around the edges of the silicon substrates during spin-coating; and (5) post Chemical Mechanical Planarization (CMP) cleaning.

Presently, all the cleaning processes mentioned above involve the use of liquid solvent-based strippers, the majority of which are non-aqueous. In an advantageous embodiment, the solvent used in back-end cleaning is an organic solvent that includes a majority solvent, a nucleophile and an additive selected from the group consisting of corrosion inhibitors, complexing ligands and surfactants. Examples of compounds that may be advantageously employed as inhibitors are diydroxybenzene (e.g., Catecol), thiohydroxbenzene (e.g., Thiophenol), aliphatic poly-alcohols and other organic acids, such as 2-hydroxynicotinic acid or 3-hydroxy-2-napthonic acid. Examples of compounds that may be advantageously employed as surfactants are nonionic surfactants, polyethylene ethers (e.g., Brij, Triton and Tween series of surfactants), perfuloroalkanes and n-Alkane ($C_nH_{2n+1}$, $8<=n>=12$) chain carboxylic acids. Examples of compounds that may be advantageously employed as chelating agents are aliphatic diamine tetra acetic acids (e.g., ethylene diamine tetra acetic acid [EDTA]), Cyclic and Crown ethers. Those who are skilled in the art should readily appreciate that other organic solvents may benefit from the teachings of the present invention and are within the broad scope contemplated by the present invention.

During the back-end cleaning processes, dielectric and metallic films, such as TiN, are particularly vulnerable to contamination by trace alkali and alkali-earth ions, e.g., $Na^+$, $K^+$ and $Ca^{2+}$. This enhanced metal ion contamination is attributable to enhanced metal ion adsorption from the solvents used in the back-end cleaning processes. Exacerbating the contamination problem discussed above, is that the commercially supplied solvents used in the back-end cleaning processes usually contain about 10–15 ppb, i.e, 0.6 to 6.0 E15 atoms/ml solvent, alkali metal ions. With the high metal ion absorption rate, generally most of the metal ions in the solvent end up on the wafers.

It has been unexpectedly found that $TiO_2$ absorbs metal ions, such as $Na^+$ ions at a level of several orders of magnitude larger than un-oxidized TiN. The present invention, therefore, employs titanium oxide to "purify" the commercially supplied solvents used in back-end cleaning processes by removing the metal ions in the solvent before the solvent is used in the cleaning processes of production semiconductor wafers. Reducing the metal ions from the cleaning solvents reduces the potential metal contamination, which in turn, ultimately increases the devices' reliability and performance.

Figure 2:
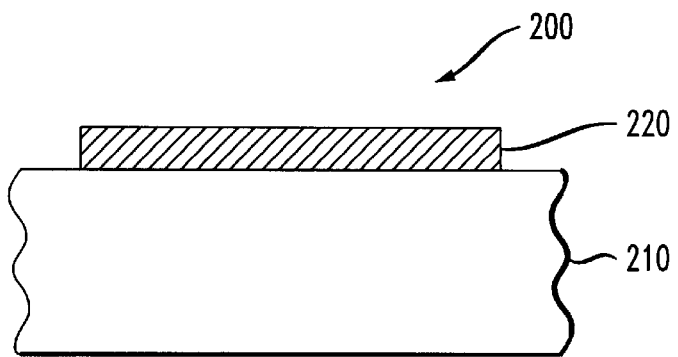
FIG. 2 illustrates an embodiment of a "sacrificial" body constructed using the principles of the present invention.

Turning now to FIG. 2, illustrated is one embodiment of a "sacrificial" body 200 constructed using the principles of the present invention. The sacrificial body 200 includes a substrate layer 210, which may be formed from materials such as silicon, germanium, germanium arsenide or other materials known to those who are skilled in the art. A metal layer 220, comprising a oxidizable titanium compound, is formed over the substrate layer 210 using conventional processes. It should be noted specifically that, in an advantageous embodiment, the sacrificial body 200 includes back-end processing structures only, such as the oxidizable titanium compound and does not include front-end processing structures. This particular embodiment, therefore, provides a less costly sacrificial body than those embodiments wherein both front-end and back-end processing are present. In another embodiment, the sacrificial body 200 is a production wafer that has an oxidizable titanium compound thereon, such as the TiN/Ti/Al-alloy/TiN/Ti film stack that is often formed on the top of the semiconductor wafer. In an advantageous embodiment, the oxidizable titanium compound is titanium nitride that is subsequently exposed to an oxygen environment to form titanium oxide. The titanium oxide on the sacrificial semiconductor wafer reacts with the contaminant metals in the solvent to substantially remove them from the solvent to provide a solvent that is cleaner than the commercially available solvents. The use of the sacrificial body 200 in a method to purify the solvents used in the back-end cleaning processes is described hereinafter, with continuing reference to FIGS. 1 and 2.

Figure 3:
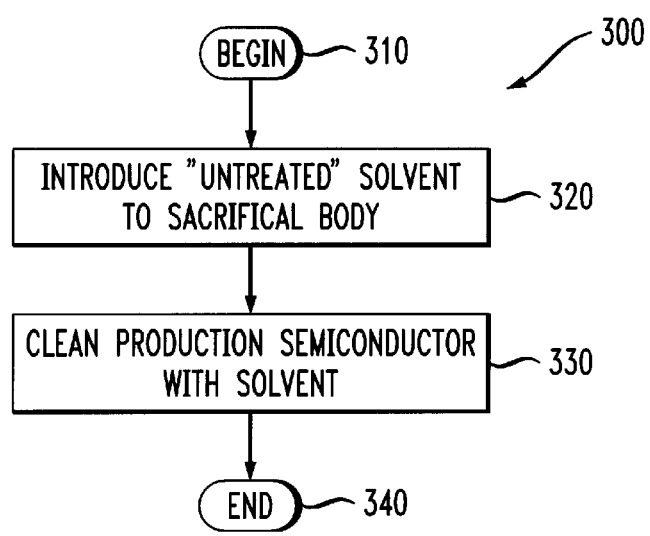
FIG. 3 illustrates an exemplary flowchart of an embodiment of a treatment process using the principles disclosed by the present invention.

Turning now to FIG. 3, illustrated is an exemplary flow-chart of an embodiment of a treatment process 300 using the principles disclosed by the present invention. The process 300 is initiated in step 310. Following the initiation of the process 300 and prior to cleaning the semiconductor 100 with a cleaning solvent, in step 320, the solvent is first exposed to a sacrificial body 200 or a plurality of such sacrificial bodies. After the sacrificial body 200 is removed from the solvent, in step 330, the production semiconductor 100 is placed in a cleaning bath with the solvent to complete the back-end cleaning process. After the semiconductor 100 is cleaned, the process 300 ends in step 330. It should be readily apparent that once the contaminate metal ions are removed from the solvent, multiple batches of production semiconductors 100 may be cleaned in the filtered solvent. The use of the cleaned or filtered solvent thus substantially reduces the contaminant metals, and thereby provides a cleaner and more reliable semiconductor device. Although the present invention is discussed in the context of back-end cleaning processes, the present invention contemplates its use in any fabrication phase.

In another embodiment, the cleaning solvents are applied to the production semiconductor wafers via other means, such as in the form of a spray. A schematic diagram of this particular embodiment is illustrated in FIG. 4, which will now be discussed in detail.

Figure 4:
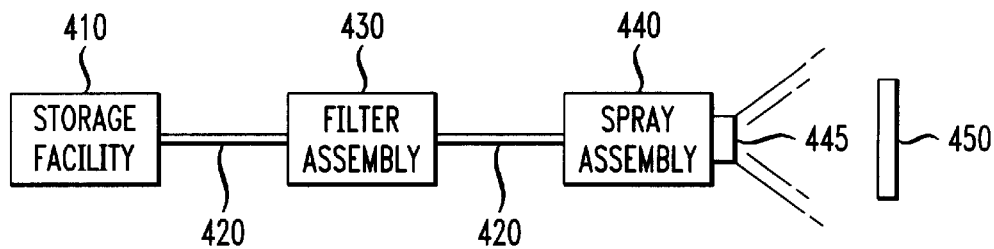
FIG. 4 illustrates a block diagram of an embodiment of a solvent delivery system employing a sacrificial body that comprises a filter assembly constructed using the principles of the present invention.

Turning now to FIG. 4, illustrated is a block diagram of an embodiment of a solvent delivery system 400 employing another embodiment of above-mentioned sacrificial body. In this particular embodiment, the sacrificial body may be a filter assembly 430 constructed using the principles of the present invention. The solvent delivery system 400 includes a solvent storage facility 410, such as a tank or drum, that is used to store the "untreated" solvent which includes metal contaminants which are selected from the group consisting of trace alkali, such as sodium or potassium, and alkali-earth, such as magnesium or calcium, metal ions. The storage facility 410 is coupled to a filter assembly 430 via a solvent feed line 420, e.g., pipes. The filter assembly 430 is also coupled to a spray assembly 440 with an attached nozzle 445 that propels or "sprays" the solvent onto the production semiconductor wafer 450 during the back-end cleaning process. In an advantageous embodiment, the filter assembly 430 includes a titanium oxide filter. Under line pressure, the solvent is passed through the titanium oxide filter, which allows the titanium oxide filter to react with and remove the metal contaminants from the solvent. The filtered solvent is then applied to the production semiconductor wafer 450 using the spray assembly 440. Thus, it can be readily seen that this particular embodiment provides a method for the continuous filtering of the solvent as it is applied to the semiconductor wafers to clean them.

Another embodiment of the present invention provides application of the present invention outside the area of semiconductor wafer fabrication processes. In this particular embodiment, there is provided a method for removing contaminant metals from a solvent, comprising the steps bringing a solvent having contaminant metals therein into contact with a sacrificial body having titanium oxide associated therewith. The titanium oxide reacts with the contaminant metals to remove the contaminant metals from the solvent. Preferably, the solvent is an organic solvent comprising a majority solvent, a nucleophile, and an additive selected from the group consisting of corrosion inhibitors, complexing ligands, and surfactants. Another aspect of this particular embodiment includes the step of passing the solvent through a titanium oxide filter during the step of brining the solvent into contact with the sacrificial body. Of course, other steps in a purification process in which the method of the present invention can be employed are well known to those who are skilled in the art. For example, there are various ways in which the solvent can be brought into contact with the sacrificial body, and there are various ways in which the solvent can be transported from the sacrificial body to a final holding tank or other container.

In another aspect of this particular embodiment, the solvent includes metals contaminants that are selected from the group consisting of trace alkali and alkali-earth metal ions, and the step of bringing includes the step of the titanium oxide reacting with the alkali and alkali-earth metal ions, thereby to substantially remove the alkali and alkali-earth metal ions from the solvent. In aspect of this particular embodiment, the alkali metal ions are sodium or potassium and the alkali-earth metal ions are magnesium or calcium.

From the foregoing it can be seen that the present invention provides a method for removing contaminant metals from a solvent used in the manufacture of a semiconductor wafer. In one particularly advantageous embodiment, the method comprises the steps of bringing a solvent having contaminant metals therein into contact with titanium oxide and cleaning the semiconductor wafer with the solvent. The titanium oxide reacts with the contaminant metals to remove them from the solvent to provide a substantially cleaner solvent for the production of metal oxide semiconductor (MOS)devices. While it is within the scope of the present invention that it may be used in any fabrication phase of the MOS device, it is particularly applicable in "back-end" processes of such devices because the presence of the various interconnect metal layer prevents the use of solvents that may damage the metal interconnect structures.

Although the present invention has been described in detail, those who are skilled in the art should understand that they can make various changes, substitutions and alterations herein without departing from the spirit and scope of the invention in its broadest form.

What is claimed is:

1. A method for removing contaminant metals from a solvent used in the manufacture of a production semiconductor wafer, comprising:

bringing a solvent having contaminant metals therein into contact with a sacrificial body having titanium oxide associated therewith, said titanium oxide reacting with said contaminant metals to remove said contaminant metals from said solvent, wherein said contaminant metals are selected from the group consisting of alkali and alkaline-earth metal; and cleaning said production semiconductor wafer with said solvent.

2. The method as recited in claim 1 wherein said bringing includes placing a sacrificial semiconductor wafer in said solvent prior to said cleaning, said sacrificial semiconductor wafer having an oxidizable titanium compound thereon.

3. The method as recited in g claim 2 wherein said oxidizable titanium compound is titanium nitride and said method further comprises oxidizing said titanium nitride to titanium oxide.

4. The method as recited in claim 2 wherein said cleaning includes placing said production semiconductor wafer in a cleaning bath of said solvent subsequent to said placing.

5. The method as recited in claim 1 wherein said bringing includes passing said solvent through a titanium oxide filter prior to said cleaning.

6. The method as recited in claim 5 wherein said cleaning includes spraying said solvent on said production wafer subsequent to said passing.

7. The method as recited in claim 1 wherein said alkali metal ions are sodium or potassium.

8. The method as recited in claim 1 wherein said alkaline-earth metal ions are magnesium or calcium.

9. The method as recited in claim 1 wherein said solvent is an organic solvent comprising a majority solvent, a nucleophile, and an additive selected from the group consisting of corrosion inhibitors, completing ligands, and surfactants.

10. A method of manufacturing a production semiconductor wafer having integrated circuits formed thereon, comprising:

forming an electrically active area on said production semiconductor wafer;

forming a metal interconnect layer over said electrically active area, said metal interconnect layer electrically connected to said electrically active area;

removing contaminant metals from a solvent used to clean said metal interconnect layer, including:

bringing a solvent having contaminant metals therein into contact with a sacrificial body having titanium oxide associated therewith, said titanium oxide reacting with said contaminant metals to remove said contaminant metals from said solvent, wherein said contaminant metals are selected from the group consisting of alkali and alkaline-earth metal; and cleaning said metal interconnect layer with said solvent subsequent to bringing said solvent into contact with said sacrificial body.

11. The method as recited in claim 10 wherein said bringing includes placing a sacrificial semiconductor wafer in said solvent prior to said cleaning step, said sacrificial semiconductor wafer having an oxidizable titanium compound thereon.

12. The method as recited in claim 11 wherein said oxidizable titanium compound is titanium nitride and said method further comprises oxidizing said titanium nitride to titanium oxide.

13. The method as recited in claim 11 wherein said cleaning includes placing said production semiconductor wafer in a cleaning bath of said solvent subsequent to said placing.

14. The method as recited in claim 10 wherein said bringing includes passing said solvent through a titanium oxide filter prior to said cleaning step.

15. The method as recited in claim 14 wherein said cleaning includes spraying said solvent on a production wafer subsequent to said passing.

16. The method as recited in claim 10 wherein said alkali metal ions are sodium or potassium.

17. The method as recited in claim 10 wherein said alkaline-earth metal ions are magnesium or calcium.

18. The method as recited in claim 10 wherein said solvent is an organic solvent comprising a majority solvent, a nucleophile, and an additive selected from the group consisting of corrosion inhibitors, completing ligands, and surfactants.

19. A method for removing contaminant metals from a solvent, comprising the steps of:

bringing a solvent having contaminant metals therein into contact with a sacrificial body having titanium oxide associated therewith, said titanium oxide reacting with said contaminant metals to remove said contaminant metals from said solvent, wherein said contaminant metals are selected from the group consisting of alkali and alkaline-earth metal.

20. The method as recited in claim 19 wherein said bringing includes passing said solvent through a titanium oxide filter.

21. The method as recited in claim 19 wherein said alkali metal ions are sodium or potassium.

22. The method as recited in claim 19 wherein said alkaline-earth metal ions are magnesium or calcium.

23. The method as recited in claim 19 wherein said solvent is an organic solvent comprising a majority solvent, a nucleophile, and an additive selected from the group consisting of corrosion inhibitors, completing ligands, and surfactants.

* * * * *